United States Patent
Neutel et al.

(10) Patent No.: US 6,217,093 B1
(45) Date of Patent: Apr. 17, 2001

(54) DEVICE FOR INDIVIDUALLY ENGAGING ON A CONFIGURATION OF A NUMBER OF PRODUCTS WITH A CERTAIN MUTUAL DISTANCE

(75) Inventors: Ronald Walter Neutel, Amersfoort; Gerrit De Gooyer, Veenendaal; Ronald Fortman, Leersum; Rijk Rijksen, Elspeet, all of (NL)

(73) Assignee: EBM Techniek B.V., Scherpenzeel (NL)

( * ) Notice: Subject to any disclaimer, the term of this patent is extended or adjusted under 35 U.S.C. 154(b) by 0 days.

(21) Appl. No.: 09/352,617

(22) Filed: Jul. 13, 1999

(51) Int. Cl.[7] .................................................. B65G 47/90
(52) U.S. Cl. ...................... 294/87.1; 294/65; 198/468.3; 414/751.1
(58) Field of Search ............................. 294/1.1, 65, 81.6, 294/81.61, 81.62, 86.4, 87.1, 115, 116; 53/247, 544; 74/110; 198/429, 434, 468.3; 414/416, 751.1, 754, 783

(56) References Cited

U.S. PATENT DOCUMENTS

| | | | |
|---|---|---|---|
| 3,753,589 | 8/1973 | Hahn | 294/87.1 |
| 3,837,472 | 9/1974 | Byerly | 198/218 |
| 4,199,050 | 4/1980 | Moller | 198/429 |
| 4,329,112 | 5/1982 | Glover | 414/751 |
| 5,102,287 * | 4/1992 | Johnson et al. | 294/87.1 X |
| 5,177,434 * | 1/1993 | Suzuki et al. | 198/468.3 X |
| 5,273,152 | 12/1993 | Brun | 198/468.3 |
| 5,575,376 * | 11/1996 | Colamussi et al. | 294/65 X |
| 5,931,279 * | 8/1999 | Pedrotto et al. | 198/468.3 |

FOREIGN PATENT DOCUMENTS

283088 * 10/1992 (JP) ...................................... 294/87.1

* cited by examiner

Primary Examiner—Johnny D. Cherry
(74) Attorney, Agent, or Firm—Webb Ziesenheim Logsdon Orkin & Hanson, P.C.

(57) ABSTRACT

This invention relates to a device for engaging on a configuration of a number of products with a certain mutual distance. The present invention has a frame and a number of pushing members mounted on the frame for movement between a first and a second position. The present invention also has a drive for moving the pushing members and a number of engaging members mounted on the frame for movement with a variable mutual distance. These engaging members are configured to correspond with the configuration of the products. Each of the pushing members has a contact surface which lies against an engaging member for varying the distance between adjacent engaging members during movement of the pushing member between the first and the second position.

14 Claims, 3 Drawing Sheets

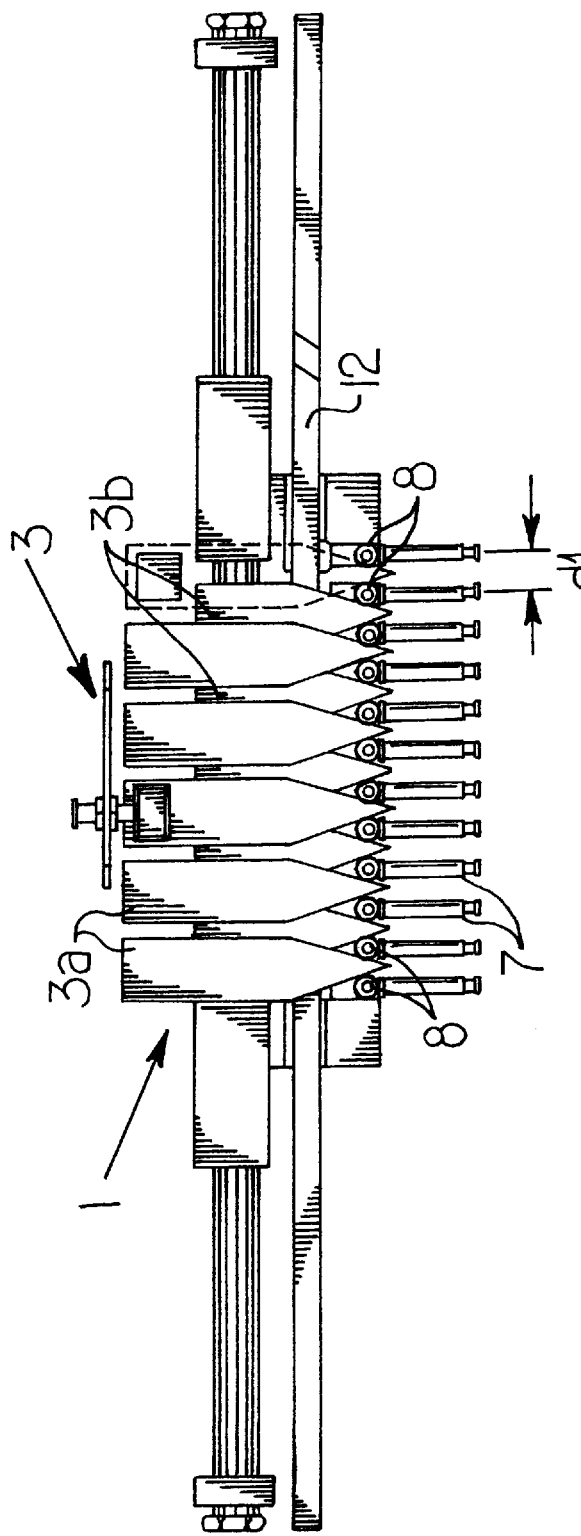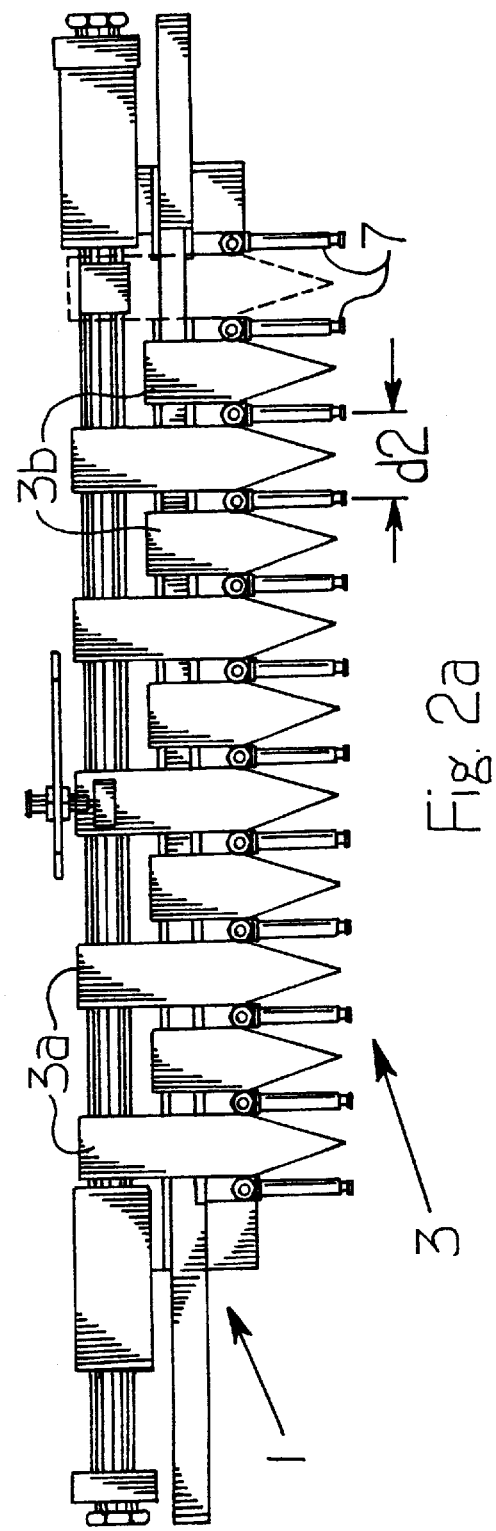

DEVICE FOR INDIVIDUALLY ENGAGING ON A CONFIGURATION OF A NUMBER OF PRODUCTS WITH A CERTAIN MUTUAL DISTANCE

BACKGROUND OF THE INVENTION

1. Field of the Invention

The invention relates to a device for individually engaging on a configuration of a number of products with a certain mutual distance.

2. Description of the Prior Art

In the packaging industry numerous such devices are known. The known devices are designed to be able to engage on a configuration of products at high speed, whereafter the mutual distance between the products can be varied over a relatively large range. In practice known devices are applied on a large scale for packing and/or unpacking products.

The known devices all have the drawback that they are designed to engage on a fixed configuration of products. Change-over in the known devices to a different configuration requires a considerable number of successive operations and is therefore time-consuming.

The invention has for its object to obviate this problem.

SUMMARY OF THE INVENTION

For this purpose the device according to the invention has the feature that it is provided with a frame;

a number of pushing members which are mounted on the frame for movement between a first and a second position;

drive means for moving the pushing members;

a number of engaging members which are disposed in a configuration corresponding with the configuration of the products and which are mounted on the frame for movement with a variable mutual distance from a starting position;

wherein each pushing member is provided with at least one contact surface with which the pushing member lies against one or more engaging members for varying the distance between adjacent engaging members during movement of the pushing member between the first and the second position; and resetting means for resetting the engaging members to the starting position.

Through the use of a pushing member with a contact surface for varying the distance between adjacent engaging members, the device according to the invention has a positive actuation over a controlled path with a continuously variable adjustment of the mutual distance between adjacent engaging members in accordance with the choice of the shape of the contact surface. In the device according to the invention the configuration of the engaging members can be varied in simple manner by removing or changing position of one or more pushing members.

In a preferred embodiment each pushing member is provided with two contact surfaces, with each of which the pushing member lies against one engaging member. The pushing members and engaging members are preferably disposed in alternating manner. This results in a very compact embodiment of the device according to the invention.

The pushing members preferably have a tapering form. More preferably the pushing members are tooth-like. In some situations a conical form is recommended, for instance when the pushing members have to be able to withstand greater forces.

In another preferred embodiment at least one stop for an engaging member is arranged on each pushing member. The stop is preferably formed by a substantially straight part of the contact surface. This has the advantage that the positioning of the pushing member can be performed with great precision, while the actuation can be somewhat less accurate owing to the possibility of a run-out provided by the straight part. As alternative hereto or in combination herewith the stop can be formed by a recessed part of the contact surface.

In a further preferred embodiment the engaging members are provided with guide means, preferably rollers, against which lie the contact surfaces of the pushing members. These rollers serve as wear parts which can be replaced simply and rapidly after a period of time, which makes maintenance of the device according to the invention exceptionally easy.

In another preferred embodiment the direction of movement of the pushing members and the direction of movement of the engaging members lie substantially transversely of one another. Particularly in combination with a tapering shape of the pushing members, this embodiment results in a small change in the position of the pushing members causing a larger change in the pitch between the engaging members.

The drive means preferably comprise a servomotor to enable the most precise possible driving of the movement of the pushing members.

The invention will be described in more detail hereinbelow with reference to the drawings:

BRIEF DESCRIPTION OF THE DRAWINGS

FIG. 1a shows schematically a front view of a device according to the invention with the pushing members in the first position;

FIG. 1b shows a perspective view of the device of FIG. 1a;

FIG. 2a shows schematically a front view of the device according to the invention with the pushing members in the second position;

FIG. 2b is a perspective view of the device of FIG. 2a.

DETAILED DESCRIPTION OF THE PREFERRED EMBODIMENTS

FIG. 1a shows a schematic front view of a preferred embodiment of a device according to the invention. Device 1 is provided with a frame 2 on which pushing members 3a and 3b and engaging members 7 are movably arranged. The pushing members are situated in the first position and the distance d1 between adjacent engaging members is consequently minimal.

Figure 1B:
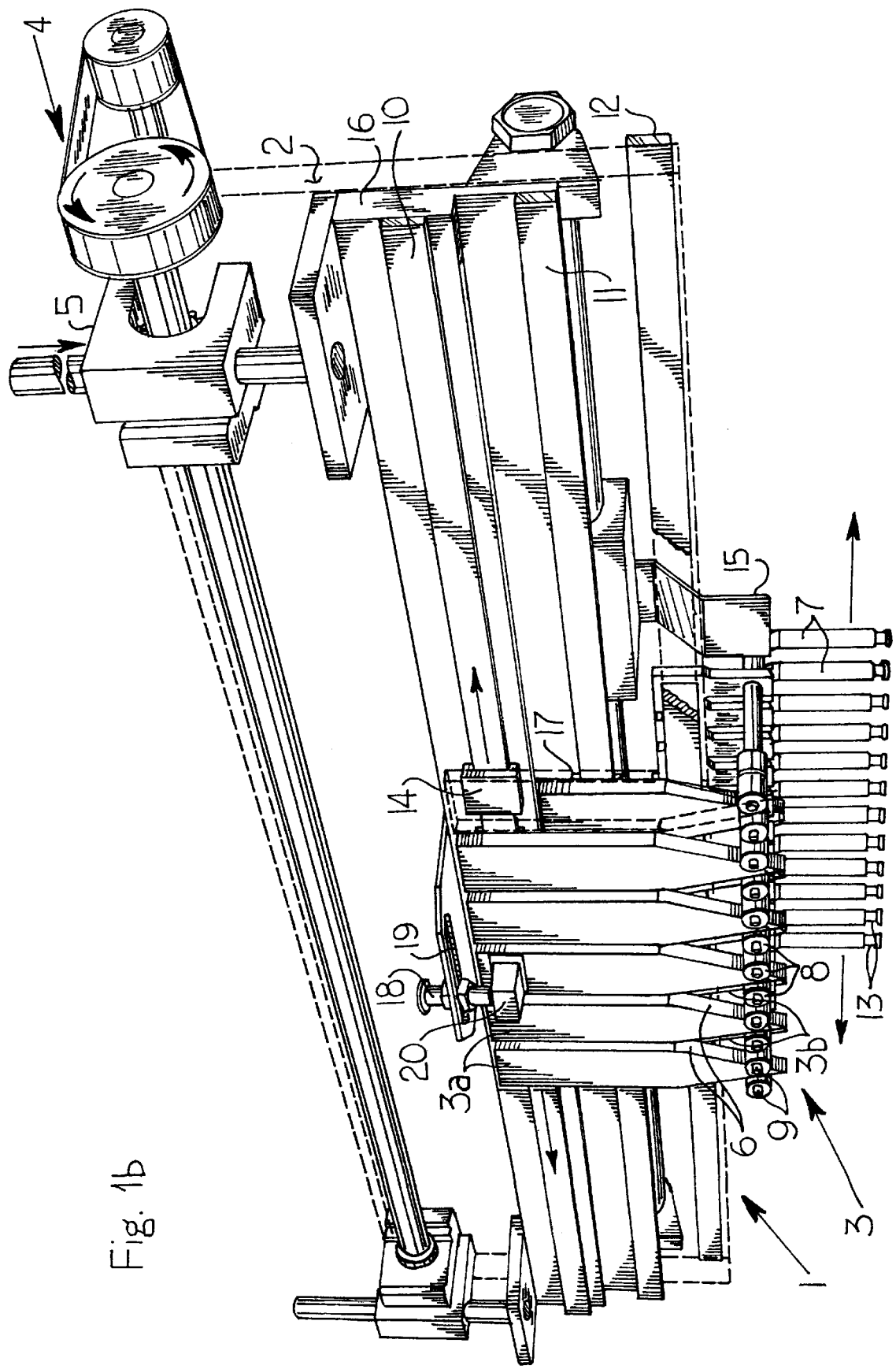

FIG. 1b shows device 1 in perspective view. In the shown preferred embodiment pushing members 3 are disposed in rows. The front row comprises large pushing members 3a which are mounted on main frame 2 by means of a linear guide 10 on subframe 16. The rear row comprises smaller pushing members 3b mounted on subframe 16 by means of linear guide 11. Pushing members 3a and 3b are mounted on linear guides 10 and 11 by means of respective snap connections 14 and 17.

Drive means 4 are provided for moving frame 16 relative to frame 2 by means of a right-angled transmission 5. Drive means 4 preferably comprise a servomotor with a sinusoidal actuation.

In the shown preferred embodiment pushing members 3a and 3b take a tooth-like form. Contact surfaces 6 are situated on either side of the tapering point. These contact surfaces 6 lie against rollers 8, which form guide means for engaging members 7. Engaging members 7 are also disposed in a row and mounted movably on frame 2 by means of a linear guide 12. The engaging members can be embodied in different ways. They can for instance be provided on their ends 13 with vacuum pistons or "grippers".

Rollers 8 are preferably manufactured from plastic material and are fixed round a hard metal core 9. Pushing members 3 are preferably also of plastic material. A suitable plastic for both components is for instance thermoplastic polyester, such as PETP or Arnite.

The position of a row of pushing members and engaging members is adjustable by means of nipple 18, slot 19 and locking block 20. The pushing members and engaging members can be jointly translated over the respective linear guides. The device according to the invention can thus be rapidly aligned relative to other machines. It is conceivable to automate such a translation, for instance by using a cylinder, so that the translation can be performed "during the stroke" of the device. The products are then as it were picked up by means of engaging members 7, whereafter the pitch between the products is increased or decreased and the whole configuration of products is translated over a certain distance.

Figure 2B:
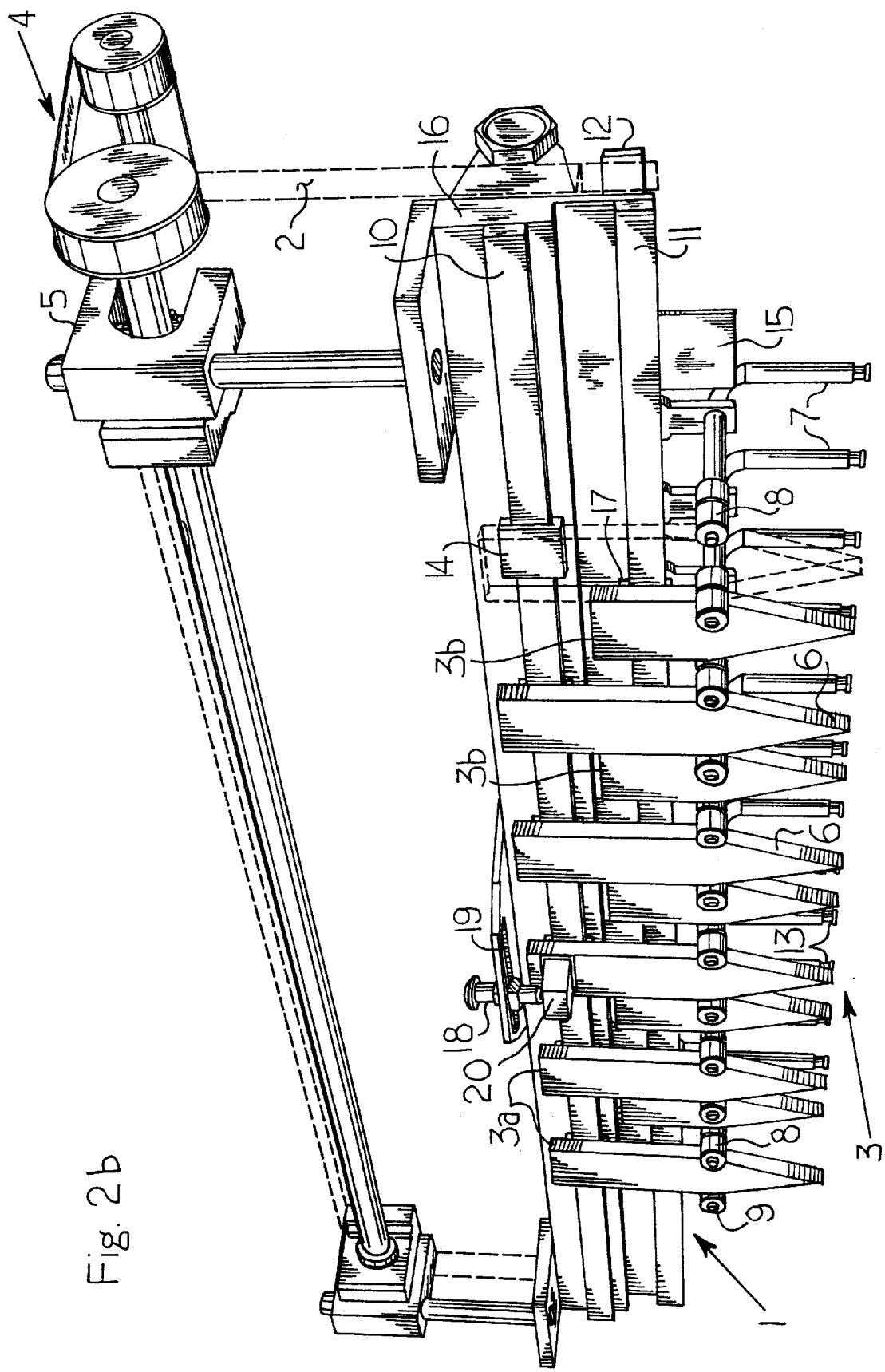

FIGS. 2a and 2b show device 1 in similar manner to FIGS. 1a and 1b, with the understanding that the pushing members are shown in their second position and the engaging members accordingly have a greater mutual distance d2.

Owing to the tapering shape of pushing members 3 a small change in the position of pushing members 3 results in a larger change in the mutual distance between adjacent engaging members 7. The tapering shape of the pushing members shown in this embodiment ensures a continuously variable adjustment of the pitch between engaging members 7. If desired, stops for rollers 8 can be arranged as required on contact surfaces 6 so as to ensure the most accurate possible positioning. Such stops can for instance be formed by a substantially straight part of the contact surface. Such straight stops are shown in the figures above contact surface 6 and connecting thereto. If desired, narrower straight parts can be added to contact surfaces 6 under the contact surfaces and connecting thereto. In this manner the first and second position of pushing members 3 are precisely defined and some tolerance results in respect of the actuation thereof. It is also conceivable to provide such stops by means of recesses in contact surface 6. The shape of pushing members 3 would then bear some resemblance to an "upside-down Christmas tree" (not shown). Many other shapes of pushing members 3 and contact surfaces 6 can be envisaged, subject to the situation.

During the reversed movement of pushing members 3, i.e. from the second position, shown in FIGS. 2a and 2b, to the first position, shown in FIGS. 1a and 1b, device 1 can be used to collect a row of products, for instance for packing thereof into a box. In practice a plurality of rows of pushing members can be placed mutually adjacent in longitudinal direction. These rows can for instance be mutually separated by a pushing member of larger dimensions (not shown). This enables simultaneous packing of a plurality of boxes disposed in a row.

The device according to the invention has a great degree of flexibility. By making changes in the shape and/or position of one or more of the pushing members, the configuration of engaging members can be adapted as required to any situation.

Resetting means 15 are provided to bring about the reduction in the pitch between engaging members 7 from d2 to d1 during the return movement of pushing members 3 from the second position to the first position. In the shown preferred embodiment resetting means 15 are actuated independently of the pushing members and/or engaging members. Resetting means 15 can however be embodied in many alternative ways. They can for instance be spring-loaded. It is also possible to provide the pushing members with a second contact surface which performs the reset function.

Shown in the figures is a preferred embodiment, in which the pushing members and engaging members are disposed in a row configuration. In practice this will be the most usual embodiment, but it will be readily apparent to the skilled person that the inventive concept will also find application in alternative configurations, including for instance circular configurations.

The invention is of course not limited to the shown and described preferred embodiment, but comprises all embodiments which are consistent with the foregoing description and which fall within the scope of the appended claims.

What is claimed is:

1. A device for individually engaging on a configuration of a number of products with a certain mutual distance, comprising:

a frame;

a number of pushing members which are mounted on the frame for movement between a first and a second position;

drive means for moving the pushing members;

a number of engaging members which are disposed in a configuration corresponding with the configuration of the products and which are mounted on the frame for movement with a variable mutual distance from a starting position;

wherein each of the pushing members is provided with at least one contact surface with which the pushing member lies against at least one of the engaging members for varying the distance between adjacent engaging members during movement of the pushing member between the first and the second position; and resetting means for resetting the engaging members to the starting position.

2. The device as claimed in claim 1, wherein each of the pushing members is provided with two contact surfaces, with each of which the pushing member lies against one engaging member.

3. The device as claimed in claim 2, wherein the pushing members and the engaging members are disposed in an alternating manner.

4. The device as claimed in claim 1, wherein the pushing members and the engaging members are disposed in an alternating manner.

5. The device as claimed in claim 1, wherein the pushing members have a tapering form.

6. The device as claimed in claim 1, wherein the pushing members are tooth-like.

7. The device as claimed in claim 1, wherein at least one stop is arranged on each of the pushing members.

8. The device as claimed in claim 7, wherein the stop is formed by a substantially straight part of the at least one contact surface.

9. The device as claimed in claim 1, wherein the engaging members are provided with guide means against which lie the at least one contact surface of the pushing members.

10. The device as claimed in claim 9, wherein the guide means are rollers.

11. The device as claimed in claim 1, wherein the pushing members are plastic.

12. The device as claimed in claim 1, wherein at least one of the pushing members and the engaging members are arranged movably on the frame by means of a linear guide.

13. The device as claimed in claim 1, wherein a direction of movement of the pushing members and the direction of movement of the engaging members lie substantially transversely to one another.

14. The device as claimed in claim 1, wherein the drive means include a servomotor.

* * * * *

UNITED STATES PATENT AND TRADEMARK OFFICE
CERTIFICATE OF CORRECTION

PATENT NO. : 6,217,093 B1
DATED : April 17, 2001
INVENTOR(S) : Ronald Walter Neutel et al.

It is certified that error appears in the above-identified patent and that said Letters Patent is hereby corrected as shown below:

Title page,
Insert: --(30) Foreign Application Priority Data
Jul 14, 1999 (NL).....................1009652 --.

Signed and Sealed this

Thirtieth Day of October, 2001

Attest:

NICHOLAS P. GODICI
Attesting Officer  Acting Director of the United States Patent and Trademark Office